United States Patent
Nakashio

(10) Patent No.: US 10,838,339 B2
(45) Date of Patent: Nov. 17, 2020

(54) IMAGE FORMING APPARATUS, DITHER MATRIX GENERATION METHOD, AND DITHER MATRIX GENERATION APPARATUS

(71) Applicant: CANON KABUSHIKI KAISHA, Tokyo (JP)

(72) Inventor: Hidekazu Nakashio, Warabi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/775,670

(22) Filed: Jan. 29, 2020

(65) Prior Publication Data
US 2020/0257230 A1 Aug. 13, 2020

(30) Foreign Application Priority Data
Feb. 12, 2019 (JP) .................. 2019-022946

(51) Int. Cl.
*G03G 15/32* (2006.01)
*G03G 15/00* (2006.01)

(52) U.S. Cl.
CPC ......... *G03G 15/32* (2013.01); *G03G 15/5087* (2013.01); *G03G 2215/0468* (2013.01)

(58) Field of Classification Search
None
See application file for complete search history.

(56) References Cited

U.S. PATENT DOCUMENTS

| | | | |
|---|---|---|---|
| 5,766,807 A | 6/1998 | Delabastita et al. | |
| 5,987,219 A * | 11/1999 | Naylor, Jr. .............. | H04N 1/405 358/1.9 |
| 8,472,082 B2 | 6/2013 | Aonuma | |
| 9,967,429 B2 * | 5/2018 | Nakano ................ | H04N 1/4058 |
| 2002/0196471 A1 * | 12/2002 | Usui .................... | H04N 1/4055 358/3.13 |
| 2005/0219627 A1 * | 10/2005 | Usui ..................... | H04N 1/405 358/3.16 |
| 2006/0256355 A1 * | 11/2006 | Karito .................. | H04N 1/4055 358/1.9 |
| 2006/0279589 A1 * | 12/2006 | Yasutomi ................ | H04N 1/52 347/6 |
| 2007/0058202 A1 * | 3/2007 | Kakutani ............... | H04N 1/405 358/3.06 |
| 2007/0121137 A1 * | 5/2007 | Kakutani ........... | H04N 1/40087 358/1.9 |

(Continued)

FOREIGN PATENT DOCUMENTS

| | | |
|---|---|---|
| JP | H10-145593 A | 5/1998 |
| JP | 4702470 B2 | 3/2011 |

*Primary Examiner* — Anh-Vinh T Nguyen
(74) *Attorney, Agent, or Firm* — Venable LLP

(57) ABSTRACT

For a dither matrix used when converting multivalued data into image data for an output apparatus, thresholds are set such that a first dot and a second dot alternately become larger until both of the first dot and the second dot reach a first dot size, after both of the first dot and the second dot reach the first dot size, the first dot becomes larger until the first dot reaches a second dot size while the second dot does not become larger, and, thereafter, the second dot becomes larger until the second dot reaches the second dot size while the first dot does not become larger, and after both of the first dot and the second dot reach the second dot size, the first dot and the second dot alternately become larger.

9 Claims, 16 Drawing Sheets

(56) References Cited

U.S. PATENT DOCUMENTS

| | | | |
|---|---|---|---|
| 2010/0103435 A1* | 4/2010 | Namikata | H04N 1/4055 |
| | | | 358/1.2 |
| 2015/0286908 A1* | 10/2015 | Shibata | H04N 1/405 |
| | | | 358/3.06 |
| 2019/0028612 A1* | 1/2019 | Tezuka | H04N 1/40087 |
| 2019/0045085 A1* | 2/2019 | Dobashi | H04N 1/6038 |
| 2020/0198365 A1* | 6/2020 | Ochiai | G06K 15/027 |

* cited by examiner

IMAGE LEVEL > THRESHOLD → BLACK

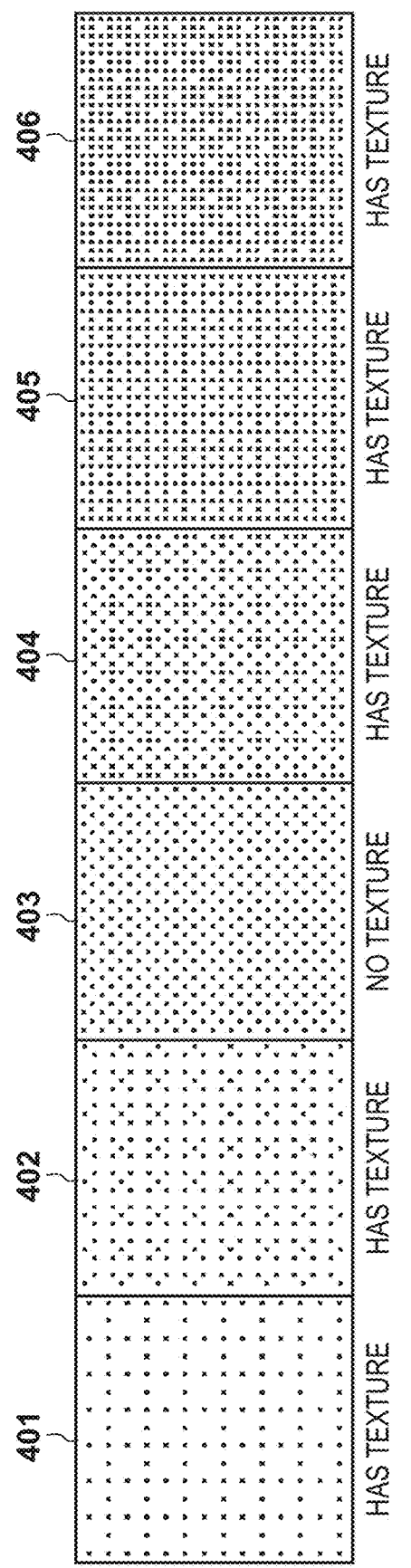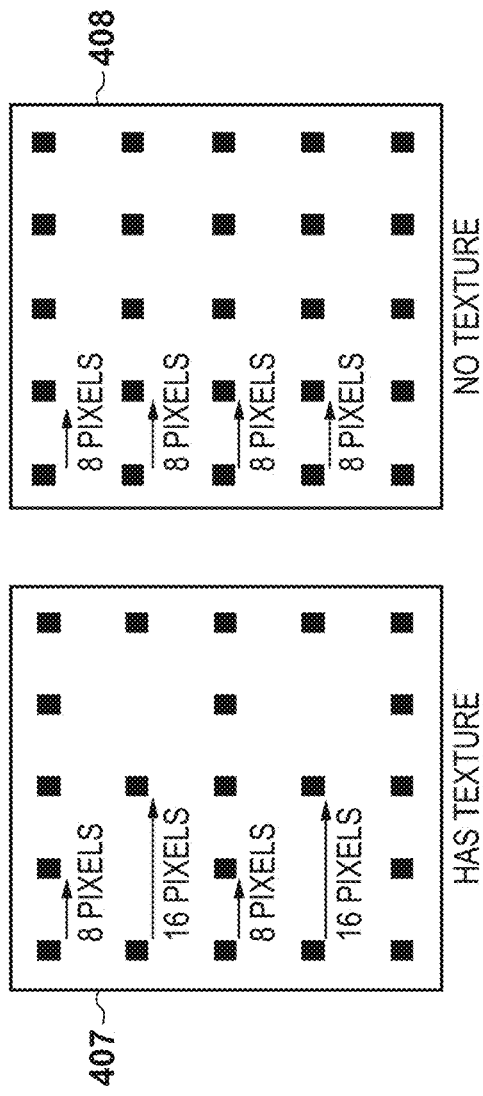
FIG. 4A
FIG. 4B

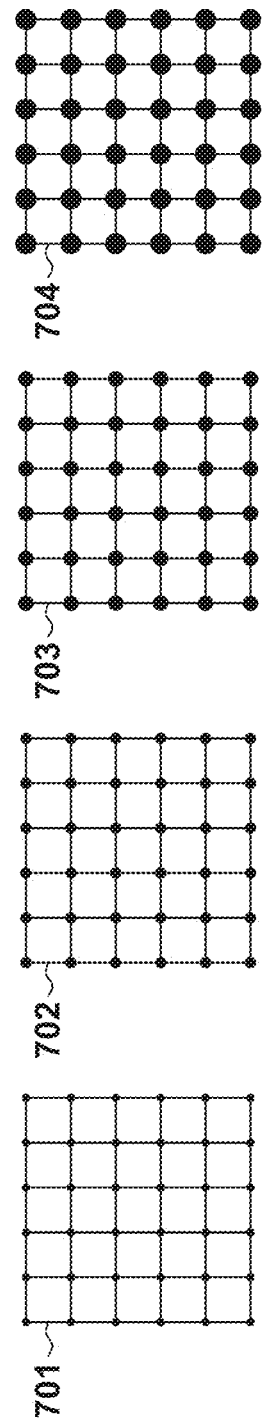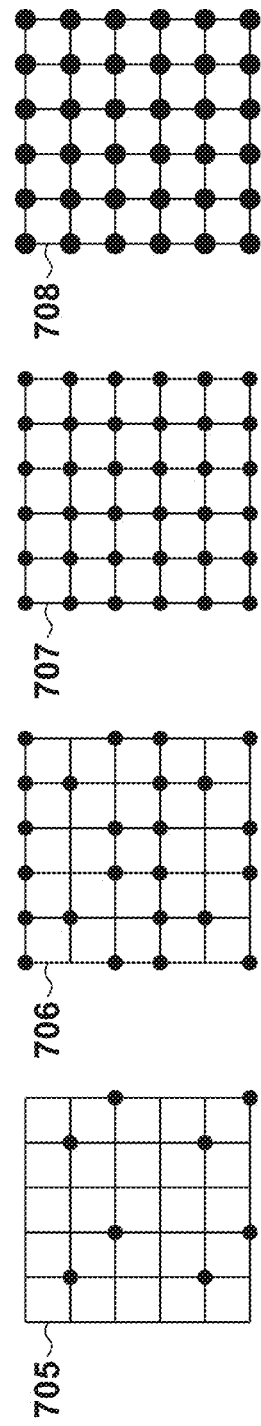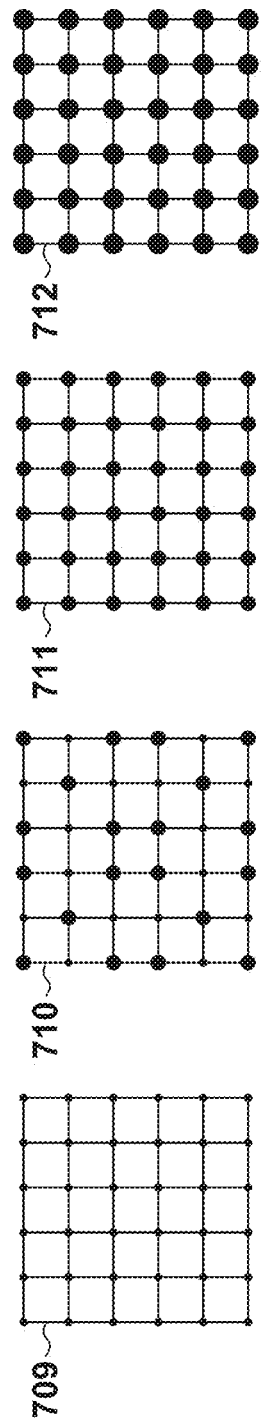

| | PARAMETER | C | M | Y | K |
|---|---|---|---|---|---|
| PATTERN 1 (901) | DOT SIZE FOR INITIALLY APPEARING SIMULTANEOUSLY (start) | 2 | 2 | 0 | 2 |
| | DOT SIZE FOR STARTING DOT CONCENTRATION (lead) | 4 | 4 | 0 | 4 |
| | DOT SIZE FOR ENDING DOT CONCENTRATION (end) | 8 | 8 | 12 | 8 |
| PATTERN 2 (902) | DOT SIZE FOR INITIALLY APPEARING SIMULTANEOUSLY (start) | 1 | 1 | 0 | 1 |
| | DOT SIZE FOR STARTING DOT CONCENTRATION (lead) | 2 | 2 | 0 | 2 |
| | DOT SIZE FOR ENDING DOT CONCENTRATION (end) | 4 | 4 | 6 | 4 |
| PATTERN 3 (903) | DOT SIZE FOR INITIALLY APPEARING SIMULTANEOUSLY (start) | 1 | 1 | 0 | 1 |
| | DOT SIZE FOR STARTING DOT CONCENTRATION (lead) | 2 | 2 | 0 | 2 |
| | DOT SIZE FOR ENDING DOT CONCENTRATION (end) | 3 | 3 | 5 | 3 |

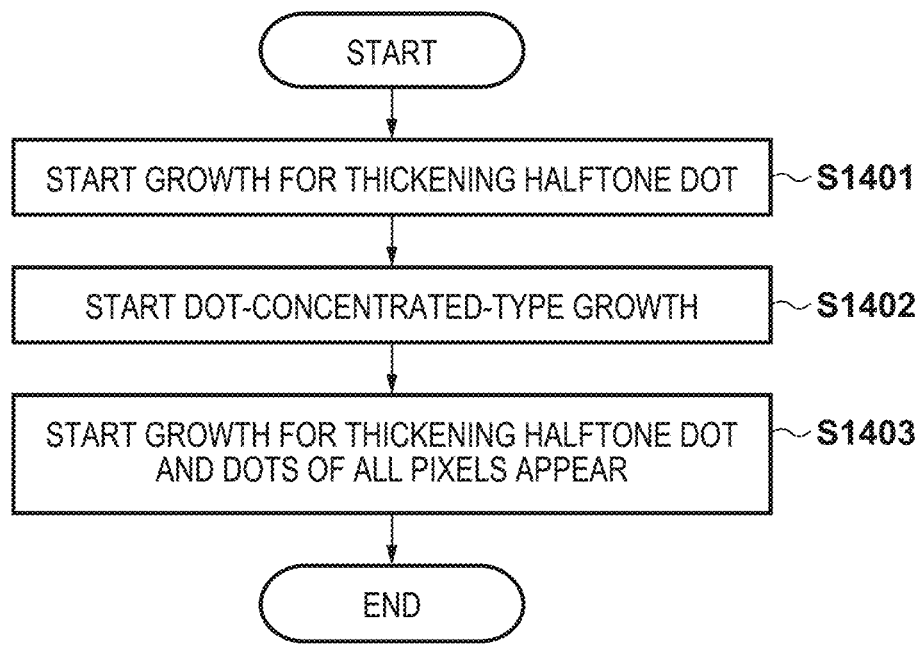

IMAGE FORMING APPARATUS, DITHER MATRIX GENERATION METHOD, AND DITHER MATRIX GENERATION APPARATUS

This application claims the benefit of Japanese Patent Application No. 2019-022946, filed Feb. 12, 2019, which is hereby incorporated by reference herein in its entirety.

BACKGROUND OF THE INVENTION

Field of the Invention

The present invention relates to an image forming apparatus capable of tone reproduction by a dither method, a dither matrix generation method, and a dither matrix generation apparatus.

Description of the Related Art

As an image printing method used in an image forming apparatus such as a printer or a copying machine, an electrophotographic method is known. In the electrophotographic method, a latent image is formed on a photosensitive drum by using a laser beam, and the latent image is developed by a charged coloring material (hereafter referred to as toner). The image printing is performed by transferring and fixing the developed toner image onto a transfer sheet. When the output image at this time is multi-tone image data that includes halftones, it is generally necessary to create an image by a pseudo halftone method using a dither method because it is difficult to obtain a halftone image with the aforementioned electrophotographic method, and conversion to achieve the halftone image is necessary. With the aforementioned dither method, dots are grown using a threshold matrix in which dots are concentrated to form stable dots in a low density region, and at that time the dot size is determined in consideration of the trade-off between resolution and graininess, and the reproducibility of the low density region.

Concerning dot growth from a low density region, Japanese Patent Laid-Open No. 10-145593 describes a method of defining dot sizes in a region with less than or equal to a low density and expressing tone in accordance with the density of dots (hereafter referred to as FM: Frequency-Modulation). In addition, a method of expressing tone by the size of dots (hereafter referred to as AM: Amplitude-Modulation) in a region with greater than or equal to a low density is described. However, in Japanese Patent Laid-Open No. 10-145593, since dots are caused to appear randomly by using an FM screen in a low density region, an extremely large threshold table is required. In contrast, Japanese Patent No. 4702470 describes the use of sub-matrices into which a threshold matrix is divided. Japanese Patent No. 4702470 describes causing dots adjusted to be adjacent to each other in a second sub-matrix to appear before dots of a first sub-matrix appear (are added).

However, in Japanese Patent No. 4702470, since growth is performed while causing dots to concentrate using a threshold matrix of a sub-matrix method, an anomalous texture occurs at a low period in a low density region, and there is a possibility that the texture will be visually recognized as moiré.

SUMMARY OF THE INVENTION

The present invention provides an image forming apparatus, a dither matrix generation method, and a dither matrix generation apparatus for suppressing the generation of textures and improving the reproducibility of density.

The present invention in one aspect provides an image forming apparatus comprising a conversion unit configured to convert multi-valued image data to image data for an output apparatus, using a dither matrix in which a threshold is set for each pixel, wherein, the thresholds are defined in the dither matrix such that a first dot and a second dot alternately become larger until both of the first dot and the second dot reach a first dot size, after both of the first dot and the second dot reach the first dot size, the first dot becomes larger until the first dot reaches a second dot size while the second dot does not become larger, and, thereafter, the second dot becomes larger until the second dot reaches the second dot size while the first dot does not become larger, and after both of the first dot and the second dot reach the second dot size, the first dot and the second dot alternately become larger.

According to the present invention, it is possible to suppress the occurrence of texture and to improve the reproducibility of density.

Further features of the present invention will become apparent from the following description of exemplary embodiments with reference to the attached drawings.

BRIEF DESCRIPTION OF THE DRAWINGS

FIGS. 4A and 4B are diagrams showing a situation of the occurrence of a texture.
FIGS. 6A and 6B are diagrams for describing a dot growth process in alignment with a threshold matrix.
FIGS. 7A to 7C are diagrams for describing a process of performing dot growth.
FIGS. 8A to 8C are diagrams for describing updating thresholds of a threshold matrix.
FIG. 9 is a diagram showing a table in which the dot size is determined for each pattern.
FIGS. 12A and 12B are diagrams for describing a dot growth process in alignment with a threshold matrix.
FIGS. 13A to 13C are diagrams for describing updating thresholds of a threshold matrix.
FIG. 14 is a flowchart showing a dot growth operation.

DESCRIPTION OF THE EMBODIMENTS

Figure 1:
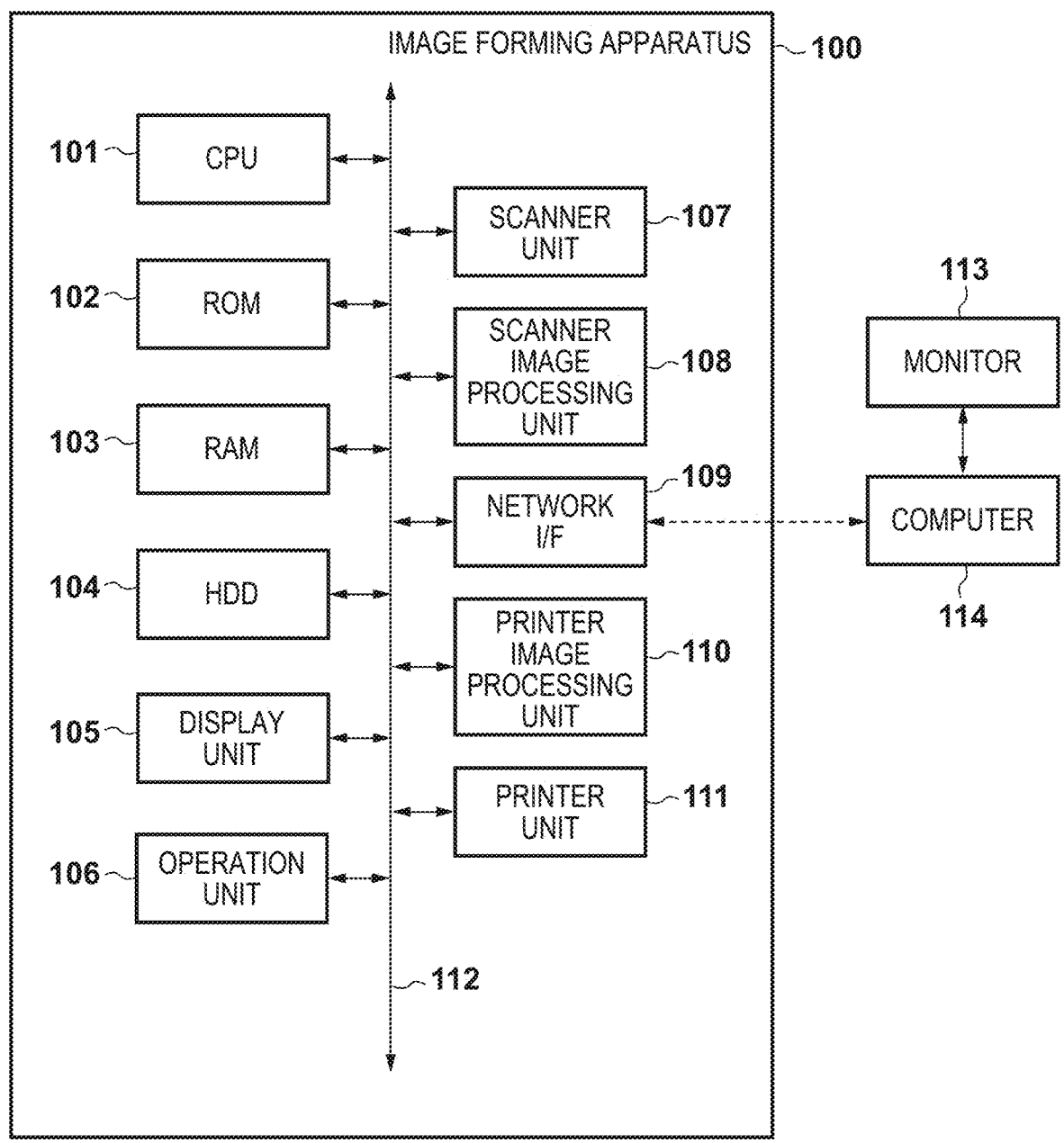
FIG. 1 is a diagram showing a configuration of a system.

Hereafter, embodiments will be described in detail with reference to the accompanying drawings. Note that the following embodiments are not intended to limit the invention according to the claims. Although a plurality of features are described in the embodiments, not all of the plurality of features are essential to the invention, and the plurality of features may be arbitrarily combined.

Furthermore, in the accompanying drawings, the same reference numerals are assigned to the same or similar components, and a repetitive description thereof is omitted.

First Embodiment

The configuration of the system according to the present embodiment will be described with reference to FIG. 1. The present system is configured by including a printer that configures the image forming apparatus 100. The image forming apparatus according to the present embodiment is a color image forming apparatus represented by the four colors of C (cyan), M (magenta), Y (yellow), and K (black). The image forming apparatus 100 includes a CPU 101, a ROM 102, a RAM 103, an HDD 104, a display unit 105, and an operation unit 106. The image forming apparatus 100 includes a scanner unit 107, a scanner image processing unit 108, a network I/F 109, a printer image processing unit 110, and a printer unit 111. These blocks are configured to be able to transmit and to receive data to and from each other via the system bus 112. A computer (hereafter referred to as a PC) 114, which is an information processing apparatus, is connected to the image forming apparatus 100, and a monitor 113 is connected to the PC 114. Note that the image forming apparatus 100 and the PC 114 may be directly connected to each other by cables, or the like, or may be connected to each other via a wired or wireless network.

The CPU 101 is a central processing unit that performs overall control and arithmetic processing for the entire image forming apparatus 100, and executes, for example, image processing to be described later based on programs stored in the ROM 102. The ROM 102 is a read-only memory, and is a storage area for a system activation program, a program for controlling the scanner unit 107 and the printer unit 111, character data, character code information, and the like. The RAM 103 is a random access memory, and is used when programs and data stored in the ROM 102 are loaded and executed by the CPU 101 for each of a variety of processes. The RAM 103 is used as a data storage region for image data acquired by the scanner unit 107 or image data received from a network I/F 109. The HDD 104 is configured by, for example, a hard disk, and is used to store results of processing executed by the CPU 101, programs, files, data, image data, and the like. The HDD 104 is also used as a work area when processing is executed by the CPU 101.

The display unit 105 performs a screen display in accordance with, for example, a liquid crystal, and is used for display of a setting state of the device, processing of each unit such as the CPU 101, an error state, and the like. The operation unit 106 accepts various user operations such as a change or reset of a setting performed by a user. For example, command information inputted via the operation unit 106 is stored in the RAM 103 and is used by the CPU 101.

The scanner unit 107 has a configuration for irradiating an original placed on an original platen (not shown) with light, converting the reflected light into an electrical signal by a CCD, or the like, having RGB color filters, and receiving the electrical signal through a parallel (or serial) cable, or the like. With such a configuration, the scanner unit 107 obtains RGB image data corresponding to an original image. The scanner unit 107 transmits the RGB image data to the scanner image processing unit 108. The scanner image processing unit 108 performs image processing such as shading processing and image area separation processing on the RGB image data read by the scanner unit 107.

The network I/F 109 connects the image forming apparatus 100 to a network such as an intranet. In addition, the network I/F 109 inputs PDL data (Page Description Language) from the PC 114. A PDL is a language for writing an output image to the printer unit 111 and instructing the printer unit 111 when printing text, an image, or the like, and the PDL is, for example, PostScript of Adobe Inc.

The printer image processing unit 110 executes image processing suitable for the printer unit 111, for example, color space conversion or correction processing, on image data subjected to image processing by the scanner image processing unit 108 or PDL data received via the network I/F 109. The printer unit 111 forms an image on a print medium in accordance with the electrophotographic processes of exposure, latent image formation, development, transfer, and fixing of CMYK image data comprising the four classes of cyan, magenta, yellow, and black, for example, processed by the printer image processing unit 110.

The monitor 113 and the PC 114 are host apparatuses of the image forming apparatus 100. That is, the PC 114 stores image data for printing in order to print, for example, an image displayed on the monitor 113 by the printer unit 111, and transmits the image data to the image forming apparatus 100 at the time of printing.

Figure 3:
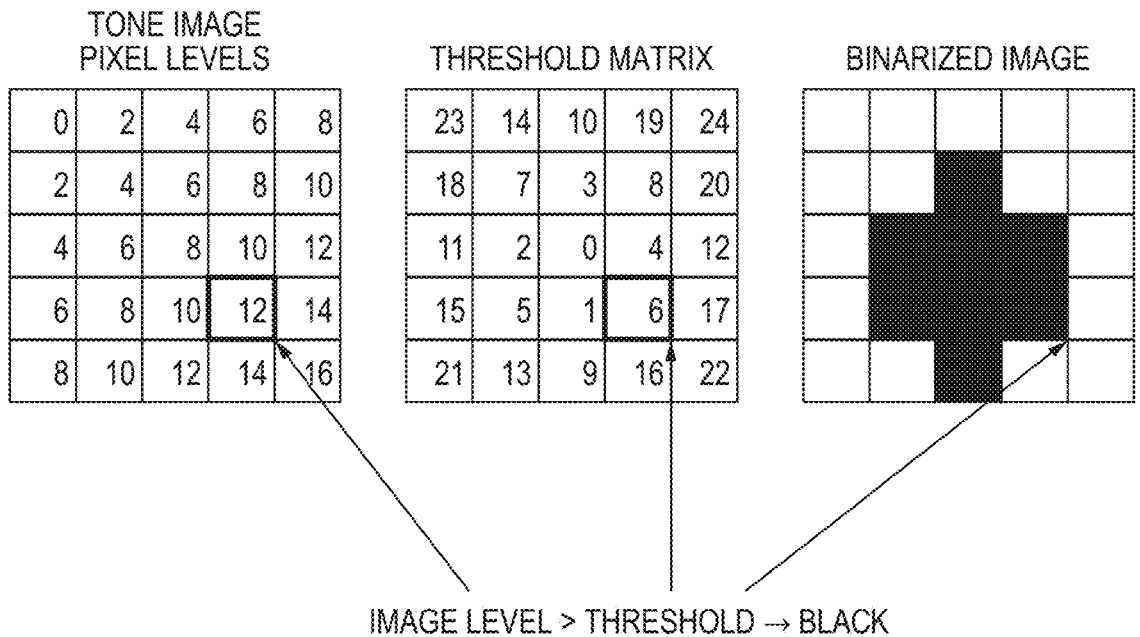
FIG. 3 is a diagram for describing the principle of image binarization.

When the image data to be printed is multi-valued image data, it is difficult for the electrophotographic printer unit 111 (output apparatus) to obtain a halftone image. Therefore, in the present embodiment, image formation is performed by the pseudo halftone method using a dither method. FIG. 3 is a diagram for describing the principle of image binarization in accordance with the dither method, which is performed in the case of a printer in which the number of tones that can be reproduced by one pixel, is two tones. In the dither method, an input multi-valued image (for example, an 8-bit tone image) is divided into N×M (5×5 in FIG. 3) blocks, and tone values of pixels in the blocks are compared with thresholds of an N×M dither matrix of the same size, to thereby output two kinds of luminance (for example, 0 and 255). For example, if a pixel value is larger than a threshold, black is output, and, otherwise, white is output. This is performed with respect to all pixels for each size of the dither matrix (threshold matrix), thereby realizing binarization of the entire image.

Figure 2:
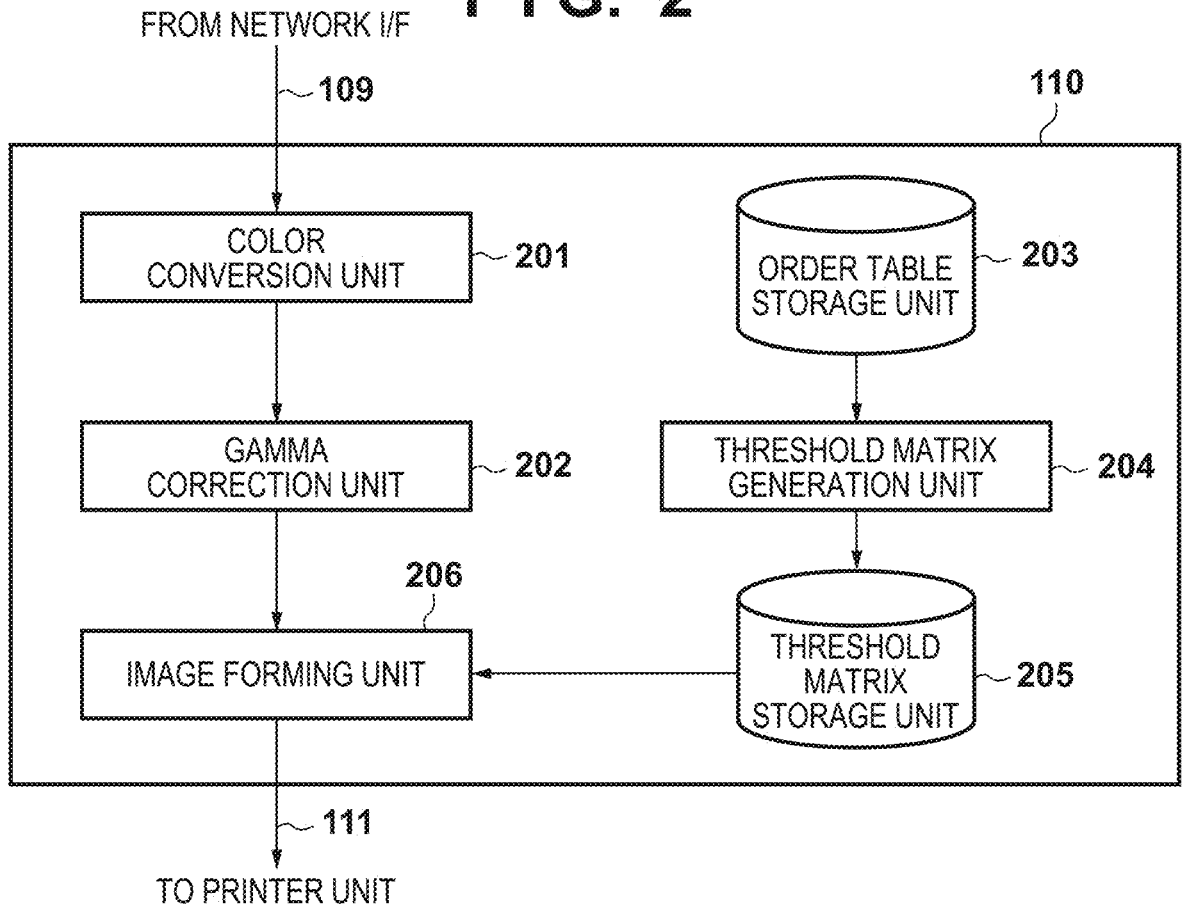
FIG. 2 is a diagram showing a configuration of a printer image processing unit.

Next, the configuration of the printer image processing unit 110 will be described. FIG. 2 is a diagram showing a configuration of the printer image processing unit 110. As shown in FIG. 2, the printer image processing unit 110 includes a color conversion unit 201, a gamma correction unit 202, an order table storage unit 203, a threshold matrix generation unit 204, a threshold matrix storage unit 205, and an image forming unit 206. In the present embodiment, a case in which each module of the printer image processing unit 110 is implemented as a hardware circuit such as an ASIC (Application Specific Integrated Circuit) is envisioned, but there is no limitation to this. For example, each module may be realized by a general-purpose processor executing a program corresponding to each function of the printer image processing unit 110. A configuration may be taken such that the general-purpose processor and the hardware circuit cooperate with each other.

The CPU 101 receives a print job from the PC 114. Then, the CPU 101 transmits a print instruction based on multi-tone image data (for example, bitmap data whose depth is eight bits) included in the received print job and the image data that is included in the job to the printer image processing unit 110. The printer image processing unit 110, which has received the instruction from the CPU 101, generates CMYK print data that can be processed by an output apparatus based on the multi-tone image data. An image forming process executed by the printer image processing unit 110 will be described below.

The color conversion unit 201 converts inputted RGB image data into CMYK image data based on a color conversion table. At this time, the color conversion table has, for example, 16×16×16 lattice points defined by RGB values, and CMYK values corresponding to these lattice points are stored as table data. The CPU 101 converts RGB image data into CMYK image data by performing interpolation operations such as tetrahedral interpolation and cubic interpolation on the basis of the table data. With respect to the CMYK image data converted by the color conversion unit 201, the gamma correction unit 202 performs a gamma correction process for keeping the tone characteristics of the printer unit 111 constant, using 1D-LUT data stored in advance.

The order table storage unit 203 stores an order table indicating a number of lines and an angle of the dither, and an order of dot growth. The threshold matrix generation unit 204 loads from the ROM 102 a predetermined dot size corresponding to an environmental sensor or a number of output sheets in the output apparatus. Then, the threshold matrix generation unit 204 generates a threshold matrix using an order table stored in the order table storage unit 203, and stores the generated threshold matrix in the threshold matrix storage unit 205. The threshold matrix storage unit 205 stores the threshold matrix generated by the threshold matrix generation unit 204.

Using the threshold matrix stored in the threshold matrix storage unit 205, the image forming unit 206 converts the CMYK image data gamma-corrected by the gamma correction unit 202 into N-bit (N is an integer) halftone image data for an output apparatus, and sends the halftone image data to the printer unit 111.

Next, a situation of a dither process using a threshold matrix in the present embodiment will be described with reference to FIG. 7. As shown in FIG. 7A, in the case of dithering processing by a threshold matrix of a normal AM screen, each halftone dot has an arbitrary shape such as a circle, an ellipse, a square, a rectangle, or the like, and tone expression is performed by area modulation in which dot size is changed in accordance with density. Therefore, in FIG. 7A, the density increases each time (density at step 701<density at step 702<density at step 703<density at step 704), and the dot size also increases (dot size at step 701<dot size at step 702<dot size at step 703<dot size at step 704). Here, a sub-matrix method may be used to prevent an increase in the size of the threshold matrix. However, since respective thresholds of the sub-matrices have the same order of appearance, dots tend to appear regularly.

FIGS. 4A and 4B are diagrams showing a situation of the occurrence of textures. A dot pattern 403 in FIG. 4A shows a state in which no texture is generated, and dot patterns 401, 402, 404, 405, and 406 show states that are visually recognized as textures. Whether or not a dot pattern is visually recognized as a texture is determined by whether or not dots appear (is added) at a constant periodicity in each of the vertical, horizontal, and oblique directions. If dots appear with a certain periodicity, they are not visually recognized as a texture, but if dots are activated with a different periodicity, they are visually recognized as a texture. For example, a dot pattern 407 in FIG. 4B is an enlargement of the dot pattern 402, and a dot pattern 408 is an enlargement of the dot pattern 403. When attention is paid in the lateral direction, in the dot pattern 407, a portion in which dots appear at intervals of eight pixels and a portion in which dots appear at intervals of sixteen pixels are mixed, so that the dot pattern 407 is visually recognized as a texture. In contrast, in the dot pattern 408, since dots appear at intervals of eight pixels in any portion, the texture is not visually recognized. As described above, according to the dot growth method of FIG. 7A, by using the sub-matrix method, there is a possibility that a texture generated in a process in which dots appear regularly will be visually recognized.

In contrast, in FIG. 7B, tone expression is performed using an AM screen in a low density region or higher, and tone expression is performed in a low density region or lower by frequency modulation in which the size of dots forming a dither is fixed and the number of dots is changed. Therefore, as illustrated in FIG. 7B, the density increases each time (density at step 705<density at step 706<density at step 707<density at step 708)), whereas the dot size changes (dot size at step 705=dot size at step 706=dot size at step 707<dot size at step 708). That is, with the dot growth method of FIG. 7B, the dot size is the same until step 707, and thereafter, the dot size is increased to have tone expression that is the same as in the AM screen of FIG. 7A. However, according to the dot growth method of FIG. 7B, a large threshold table is required because an FM screen is used to randomly cause dots to appear. In addition, since the halftone dots are relatively large, the possibility of being visually recognized as moiré due to the generation of a texture becomes higher.

In the present embodiment, as shown in FIG. 7C, after all halftone dots have appeared, that is, after having the number of dots that are present be the maximum (step 709), dot-concentrated-type growth for growing dots of a fixed size is performed (step 710). Then, after all the halftone dots have grown into dots of a fixed size (step 711), the process shifts to AM screen dot growth (step 712). Therefore, as illustrated in FIG. 7C, the density increases each time (density at step 709<density at step 710<density at step 711<density at step 712), whereas the dot size is changed (dot size at step 709<dot size at step 710=dot size at step 711<dot size at step 712). Therefore, at first, the dot size increases uniformly, and after all halftone dots are caused to appear, the size of each dot is sequentially grown to a fixed size. After all the halftone dots have grown into dots of a fixed size, the dot size is uniformly increased, giving density control in accordance with the above 3-step dot growth method. Hereafter, a method of generating a threshold matrix for realizing dot growth in the present embodiment will be described.

Figure 5:
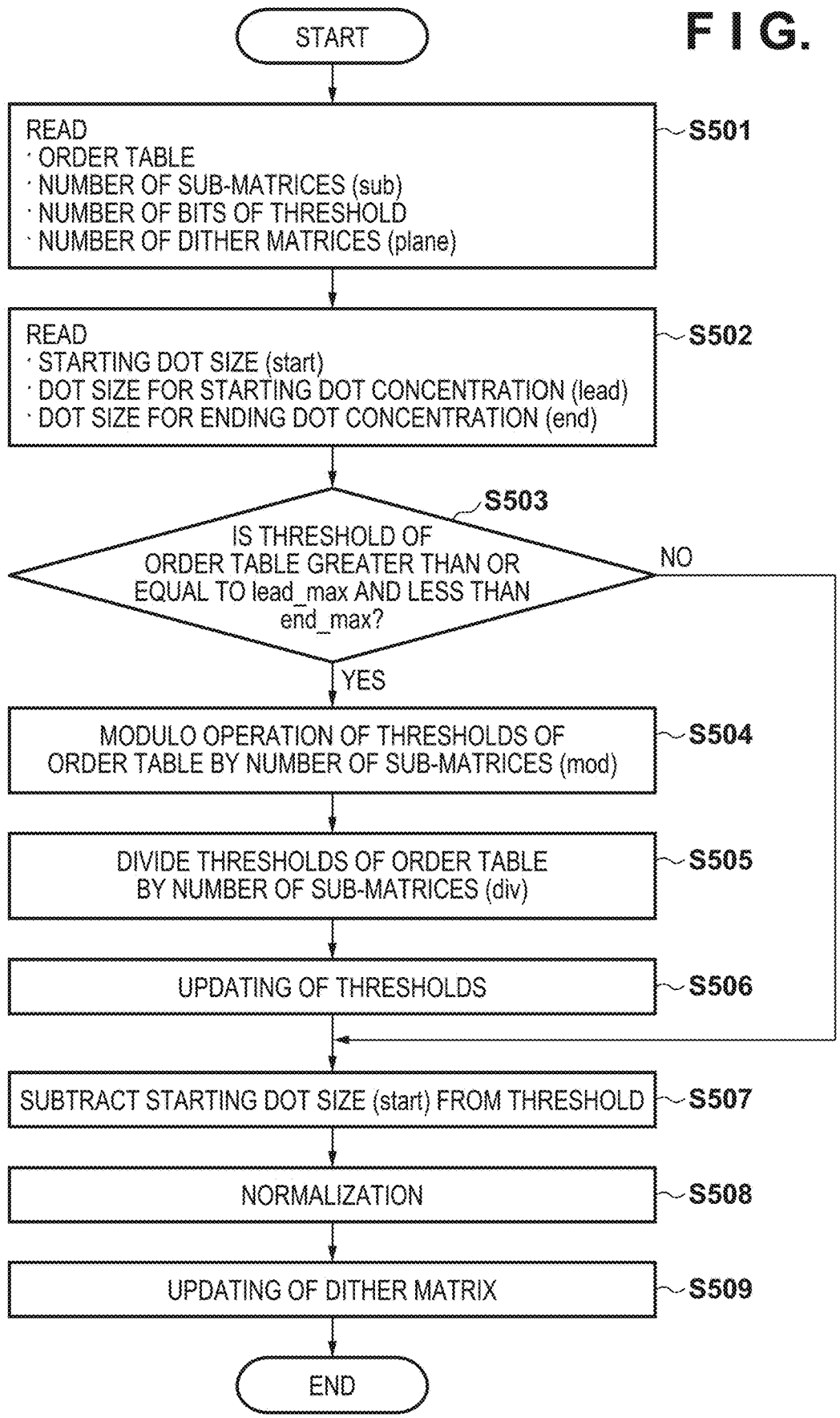
FIG. 5 is a flowchart showing a processing procedure for generating a threshold matrix.

FIG. 5 is a flowchart showing a processing procedure for generating a threshold matrix in the present embodiment. The processing of FIG. 5 is realized by, for example, the CPU 101 loading a program stored in the ROM 102 into the RAM 103 and executing the program.

Figures 8A, 8B:
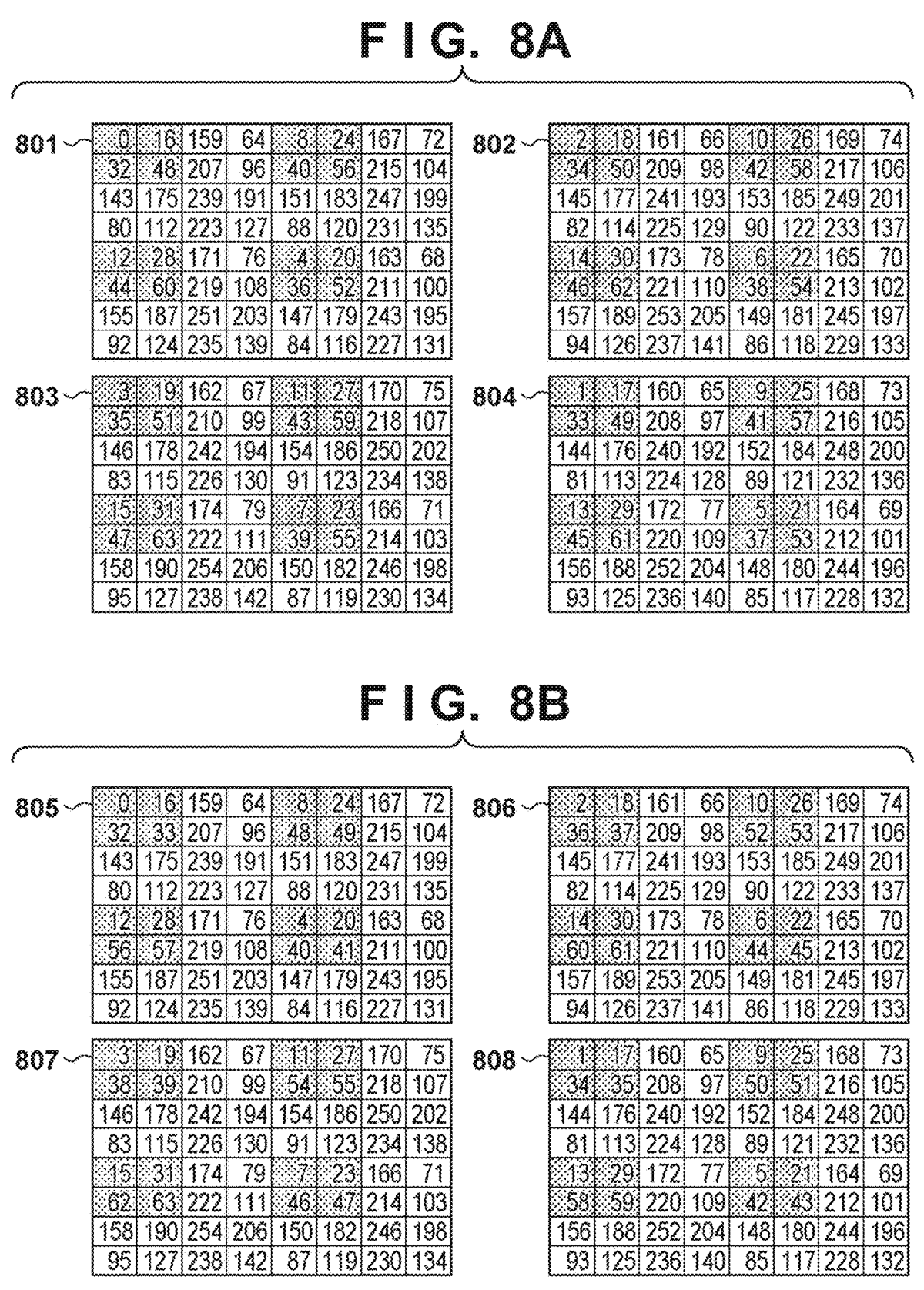

In step S501, the CPU 101 reads the order table, a number of sub-matrices (sub), a number of bits (bit) of the threshold, and a number of threshold matrices (a number of planes (plane)) that are stored in the order table storage unit 203. The order table is a table in which the order of appearance (a growth order) of dots in dither method tone reproduction is determined, and represents the tone reproduction of a normal AM screen. A submatrix method is a method of combining a plurality of matrices, in which thresholds at the same position are shifted little-by-little to generate one threshold matrix to thereby reduce an apparent matrix size (pattern). In the example of FIG. 8A, a matrix 801 is a main matrix, and matrices 802, 803, and 804 are sub-matrices in which thresholds at the same positions are shifted slightly. The number of bits (bit) of a threshold represents the number of tones that can be reproduced in the threshold matrix. The number of threshold matrices (plane) is determined based on the number of tones in which one dot can be reproduced, and is one in the case of one bit and fifteen in the case of four bits.

The number of threshold matrices (plane) will be further described. When the tones of the printer is reproduced using PWM control, the exposure time of one pixel by a laser is controlled by a pulse width of, for example, four bits. In this case, sixteen tones are reproduced in the printer. Here, in order to realize a number of tones (e.g., 1024 tones) equal to or larger than the number of tones that the printer can reproduce, area coverage modulation in accordance with the dither method is also used. For example, when the number of tones that can be reproduced by the printer is four bits and sixteen tones, about eight bits of tones (e.g., 1024 tones) can be reproduced by using area coverage modulation by the dither method between tones. In this case, since one threshold matrix is used across respective tones, if the number of tones that can be reproduced by the printer is four bits which means sixteen tones, the number of planes (plane) is fifteen. As a simpler example, when the number of tones that can be reproduced by the printer is one bit which means two tones, the number of tones that can be reproduced by using area coverage modulation together with one threshold matrix between tones is two or more tones. Therefore, if the number of tones reproducible by the printer is one which means two tones, the number of planes is one. In the present embodiment, description is given assuming that the number of planes is one.

Next, in step S502, the CPU 101 loads from the ROM 102 the starting dot size, the dot size at which dot concentration starts, and the dot size at which dot concentration ends. Here, the starting dot size (hereafter referred to as "start") is a dot size at which dot growth is started in step 709 of FIG. 7C. Here, a dot size for starting dot concentration (hereafter referred to as "lead") is a dot size at which dot-concentrated-type growth is started in step 710 of FIG. 7C. Here, a dot size for ending dot concentration (hereafter referred to as "end") is a dot size at which dot-concentrated-type growth is ended in step 710 of FIG. 7C.

Each of the above-mentioned dot sizes is changed to an appropriate dot size in accordance with a usage environment (temperature and humidity), change over time, and a sheet (print medium) to be used. Therefore, a configuration is such that a plurality of patterns of combinations of dot sizes as illustrated in FIG. 9 are stored in the ROM 102, and a pattern to be read is switched according to a condition. For example, in the case of a low temperature and low humidity environment, dots are less likely to adhere to paper than in the case of a standard temperature and standard humidity environment. Therefore, various dot sizes are set to be relatively large, as in the case of the pattern 1 of reference numeral 901. Note that, in the example of FIG. 9, since yellow has a lower visibility of dots and a texture is less likely to be seen in comparison to cyan, magenta, and black, the operation of the present embodiment is not applied. In this manner, whether or not to apply the operation of the present embodiment may be switched according to the visibility of a color. A pattern 2 of reference numeral 902 in FIG. 9 is a pattern used in an environment of a standard temperature and a standard humidity, and, therefore, the dot size is set smaller than that of pattern 1. Further, a pattern 3 of reference numeral 903 in FIG. 9 is a dot size used in an environment of high temperature and high humidity, and the dots are more likely to adhere to paper as compared with the standard temperature and standard humidity. Therefore, various dot sizes are set to be smaller than the pattern 2.

Next, in step S503, based on the order table read in step S501 and the two dot sizes of "lead" and "end" read in step S502, the CPU 101 determines whether or not a threshold obtained from a respective value of the order table is a threshold to be subjected to dot-concentrated-type growth.

Figure 6A:
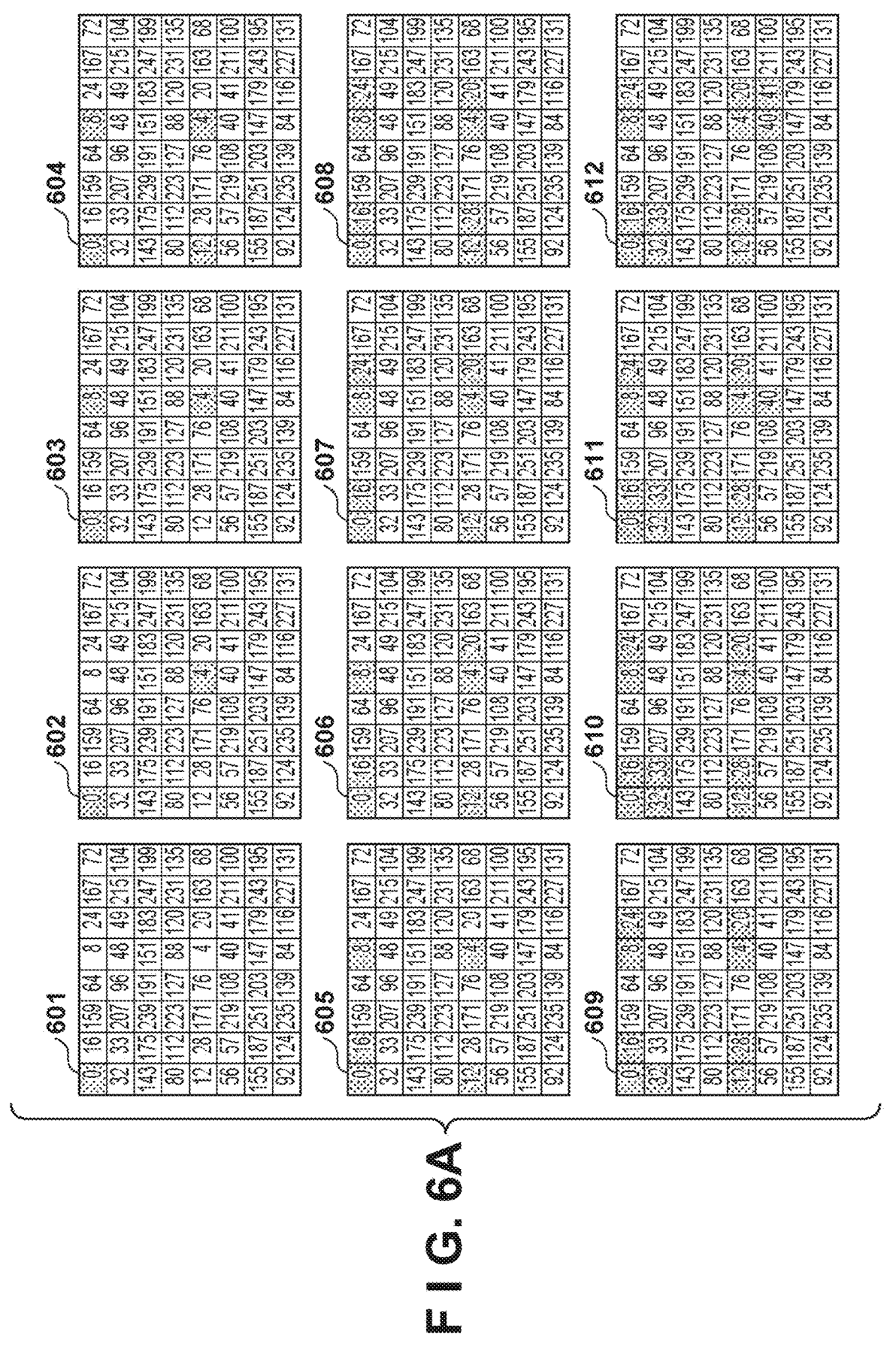
Figure 6B:
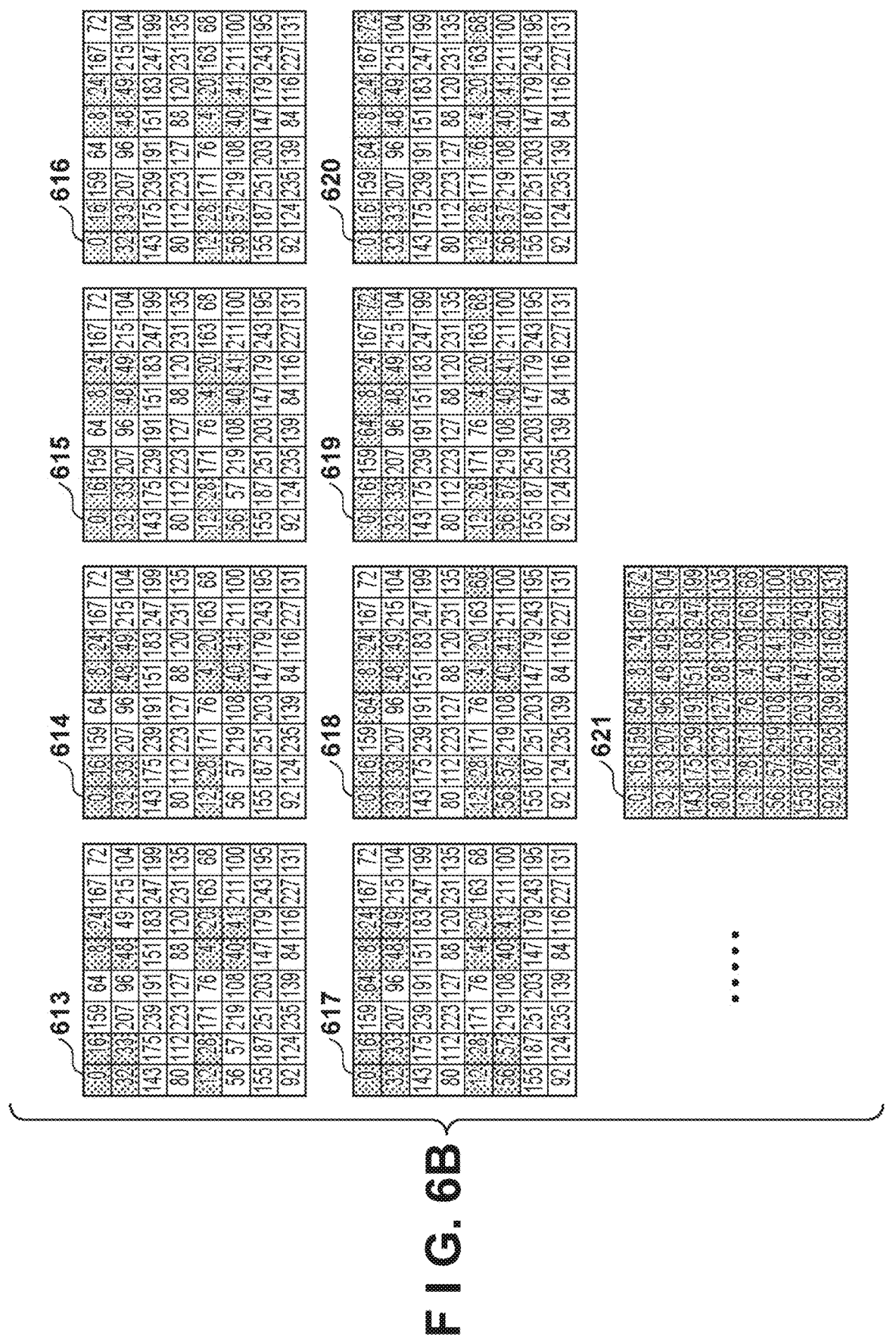

FIGS. 6A and 6B are diagrams illustrating an example of a threshold matrix having an engine resolution of 600 dpi, a screen of one hundred fifty lines and zero degrees, and where lead=two and end=four. FIGS. 6A and 6B show a process of performing the dot growth as described in FIG. 7C, and will be described below in association with steps 709 to 712 in FIG. 7C.

Threshold matrices 601 to 608 correspond to cases when the dot sizes of the halftone dots are less than "lead", and show a state of in which dots appear at locations corresponding to the thresholds that are targets of growth for increasing the densities of the dots. The growth for increasing the density of dots is growth for sequentially causing all halftone dots to become larger by causing a dot to appear pixel by pixel, and corresponds to step 709 of FIG. 7C.

In contrast, threshold matrices 609 to 616 correspond to cases when the dot sizes of the halftone dots are greater than or equal to "lead", and show a state in which locations corresponding to the thresholds that are targets of dot-concentrated-type growth are made to appear. Dot-concentrated-type growth corresponds to step 710 in FIG. 7C and is a method of growing the size of one halftone dot to a predetermined dot size (end), then shifting to the next halftone dot, and similarly growing the size of that dot. Since FIGS. 6A and 6B are examples of a case where end=4, one halftone dot is grown in the threshold matrices 609 and 610 until the dot size becomes end=4, and the next halftone dot is grown in the threshold matrices 611 and 612 until the dot size becomes end=4 in a similar manner.

Further, the threshold matrices 617 to 620 correspond to the case when the dot size of the halftone dots is greater than or equal to "end", and show a state in which dots are sequentially made to appear at each halftone dot pixel by pixel, and dots of all pixels are made to appear in the threshold matrix 621. The threshold matrices 617 to 620 correspond to step 712 of FIG. 7C.

As a determination method in step S503, calculation is performed for "lead_max" which is calculated by the following Equation (1) and "end_max" which is calculated by the following Equation (2).

$$\text{lead\_max} = \text{sub} \times \text{lead} \times \text{plane} \quad (1)$$

$$\text{end\_max} = \text{sub} \times \text{end} \times \text{plane} \quad (2)$$

Then, the CPU 101 determines that a threshold that is greater than or equal to "lead_max" and less than "end_max" is a threshold that is the target of dot-concentrated-type growth. Here, "lead_max" indicates a threshold for starting dot-concentrated-type growth, and "end_max" indicates a threshold for ending dot-concentrated-type growth. Also, "sub" indicates the number of sub-matrices, and sub=16 in the example of FIGS. 6A and 6B. In FIGS. 6A and 6B, since the number of thresholds increases and it becomes complicated, only four out of sixteen sub-matrices are shown in the drawing. The term "plane" indicates the number of threshold matrices, and plane=1 in the examples of FIGS. 6A and 6B. At this time, lead_max=32 and end_max=64. If it is determined in step S503 that the threshold is a target of dot-concentrated-type growth, the process proceeds to S504, and if it is determined that the threshold is not a target of dot-concentrated-type growth, the process proceeds to S507.

Next, in step S504, the CPU 101 performs a modulo operation (mod) on the threshold obtained from the order table by the number of sub-matrices (sub). Next, in step S505, the CPU 101 performs division (div) on the threshold obtained from the order table by the number of sub-matrices (sub).

Next, in step S506, the CPU 101 calculates an updated threshold (mtx) in accordance with the following Equation (3) with respect to the threshold obtained from the order table. Note that FIGS. 6A and 6B show an example where lead=2 and end=4.

$$mtx = (plane \times end) \times mod + div + (plane \times lead) \times (sub - mod - 1) \quad (3)$$

Here, "mtx" indicates the updated threshold, "mod" indicates a value resulting from performing a modulo operation on the threshold obtained from the order table by the number of sub-matrices, "lead" indicates the dot size at which dot concentration starts, and "end" indicates the dot size at which dot concentration ends. Also, "div" indicates a value obtained by dividing the threshold obtained from the order table by the number of sub-matrices, "sub" indicates the number of sub-matrices (sub=16 in FIGS. 6A and 6B), and "plane" indicates the number of threshold matrices (plane=1 in FIGS. 6A and 6B). As shown in Equation (3), the number of sub-matrices and the number of planes contribute to threshold change. According to Equation (3), for example, since sub=16, when an inputted threshold is 48, mod=0, div=3, and mtx=33.

Figure 8C:
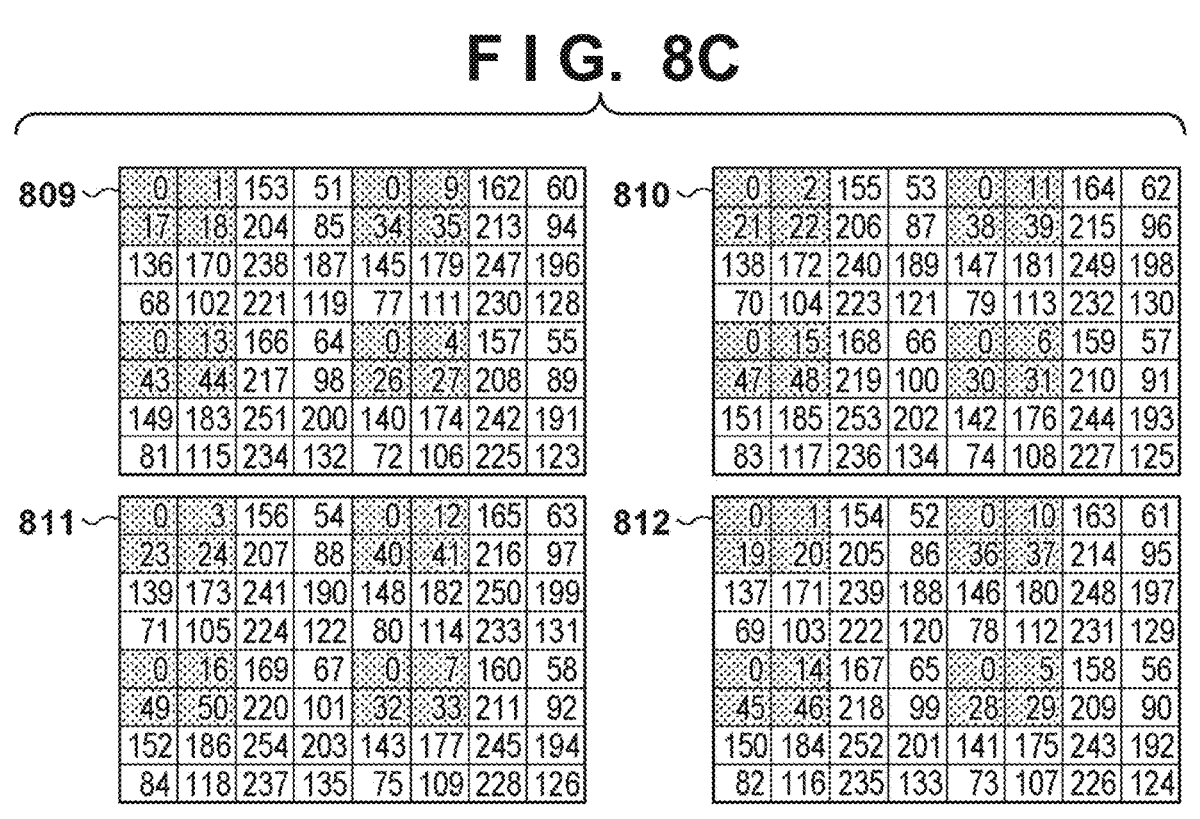

FIGS. 8A to 8C are diagrams for describing updating thresholds of a threshold matrix. The threshold matrix of FIG. 8B shows an example of updated thresholds, and compared to the threshold matrix of FIG. 8A, the updated thresholds are shown among the thresholds filled by grey. However, non-grey threshold are thresholds that are a target of the AM method, and, therefore, are not changed between FIG. 8A and FIG. 8B except that the normalization is performed in step S508 at a subsequent stage.

Next, in step S507, based on the dot size (start) to initially cause to appear at the same time, the CPU 101 determines whether or not the respective thresholds of mtx are thresholds that are targets for initially causing appearance at the same time. As a determination method, the number of dots (start_max) to initially cause to appear at the same time is calculated by the following Equation (4).

$$start\_max = sub \times start \times plane \quad (4)$$

A threshold less than "start_max" is changed to zero from the threshold mtx, whereas start_max is subtracted from the threshold mtx for thresholds greater than or equal to the start_max. Here "start_max" denotes a threshold for initially causing appearance simultaneously, "sub" denotes the number of sub-matrices (sub=16 in FIGS. 6A and 6B), and "start" denotes the size of dots to initially cause to appear simultaneously. FIGS. 6A and 6B show a case where start=zero. The term "plane" indicates the number of threshold matrices (plane=one in the examples of FIGS. 6A and 6B). The reason for initially causing dots to appear at the same time is that it is difficult to form one dot in a high resolution engine such as where the engine resolution is 2400 dpi because of electrophotographic characteristics. Therefore, the size of dots (start) to initially cause to appear simultaneously is determined in advance, and when start=one, single dots are collectively caused to appear for each halftone dot at the start. That is, the steps of the threshold matrices 601 to 603 in FIG. 6A are skipped, four dots of the threshold matrix 604 appear collectively, and then the subsequent growth (growth of the threshold matrix 605 and thereafter) is performed. Thus, by narrowing the tone region in which dots are not reproduced in a low density region, the reproducibility of the low density region can be enhanced.

Next, in step S508, the CPU 101 performs normalization on the thresholds updated in step S507 based on the largest value of the threshold and the number of bits (bit) of the threshold. In step S509, the CPU 101 stores the threshold normalized in step S508 as the corrected threshold matrix in the threshold matrix storage unit 205. Through the above-described process, the threshold matrix is generated based on the three dot sizes ("start", "lead" and "end") that are determined for the respective colors.

The threshold matrix of FIG. 8C shows an example of updated thresholds that are ultimately created. Compared with the threshold matrix of FIG. 8A, the thresholds filled in grey were update targets, and further, since start=one, updates were made to have thresholds to simultaneously cause appearance initially by one dot. However, non-grey thresholds are thresholds that are a target of the AM method, and, therefore, are not changed between FIG. 8A and FIG. 8C except that the normalization is performed in step S508.

Figure 10:
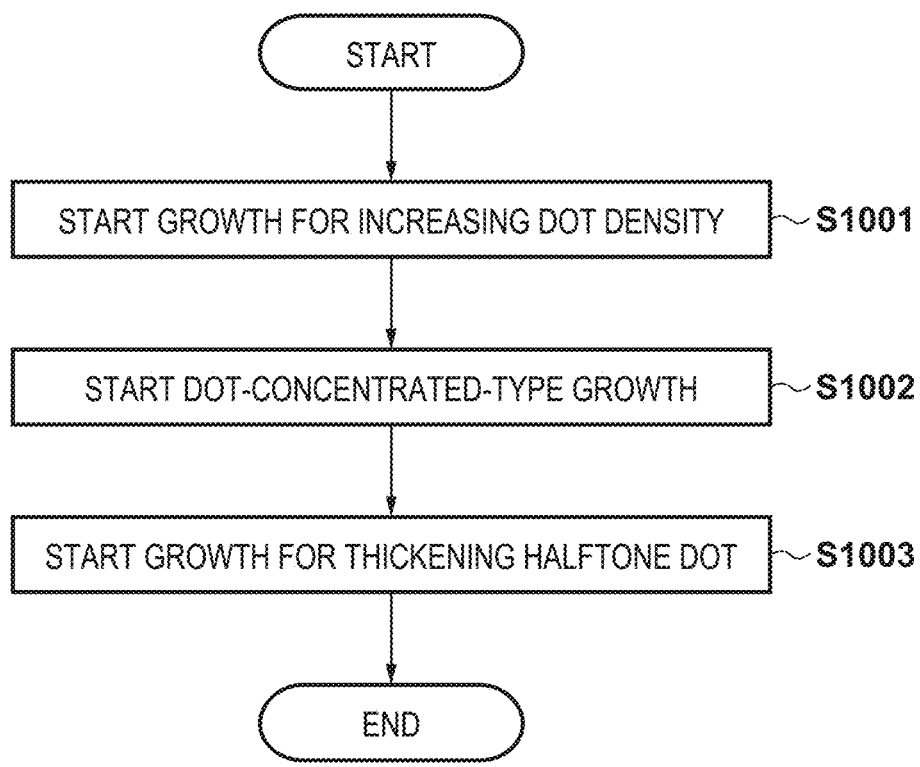
FIG. 10 is a flowchart showing a dot growth operation.

FIG. 10 is a flowchart for describing an operation of dot growth by using the threshold matrix generated by FIG. 5.

In step S1001, the image forming unit 206 starts an appearance operation in accordance with growth for increasing dot density. Growth for increasing dot density is a growth method in which all halftone dots sequentially become larger by causing a dot to appear pixel by pixel, and corresponds to the appearance states of step 709 in FIG. 7C and the threshold matrices 601 to 608 in FIG. 6A. When the densities of the dots are maximized, the state proceeds to step S1002. Here, the maximum-density state of the dots indicates the state of the threshold matrix 608 in FIG. 6A when lead=two. Note that step S1001 includes growth such as the threshold matrices 601 to 603 in FIG. 6A when start=zero, and growth due to simultaneous appearance such as the threshold matrix 604 in FIG. 6A when start=one. That is, if the input image is an extremely low density image having a predetermined density or less, dots having a size of two or less are turned on at reference positions for the dot growth as shown in the threshold matrices 601 to 608.

In step S1002, the image forming unit 206 starts the dot-concentrated-type growth. Dot-concentrated-type growth corresponds to step 710 in FIG. 7C and the threshold matrices 609 to 616 of FIGS. 6A and 6B, and is a method of growing the size of one halftone dot to a predetermined dot size (end), then shifting to the next halftone dot, and similarly growing the size of that dot. When the dot sizes of all the halftone dots become the dot size (end), the process proceeds to step S1003. Here, in the case when end=four, the process proceeds to step S1003 when the threshold matrix 616 state in FIG. 6B is achieved. That is, if the input image is a low-density image to a medium-density image of a predetermined density or more and less than a second predetermined density, dots appear as shown in the threshold matrices 609 to 616. Specifically, dots having a size of two or more, and a size of four or less appear at reference positions for dot growth.

In step S1003, the image forming unit 206 sequentially causes a dot in one pixel to appear at each halftone dot. Step S1003 corresponds to step 712 of FIG. 7C and the threshold matrices 617 to 620 of FIG. 6B. As shown in the threshold matrix 621, when dots of all the pixels appear, the processing of FIG. 10 ends. That is, if the input image is a medium/high density image of the second predetermined density or more, dots appears at the respective reference positions so as to gradually increase in accordance with the density.

Note that, in the present embodiment, step S1001 to step S1003 are used to describe the process of dot growth, but there is no limitation to this. For example, in accordance with a hardware circuit that the image forming unit 206 has, it is possible to generate halftone image data by comparing an input image (gamma-corrected CMYK image data) with a threshold matrix.

As described above, the image forming apparatus according to the present embodiment uses a plurality of dot sizes in a low density region to generate a threshold matrix for performing the dither process. As a result, it is possible to steadily maintain the stability of the low density region and improve the reproducibility and graininess of the low density region while suppressing the occurrence of an anomalous texture using a small threshold matrix.

Second Embodiment

Hereafter, a description will be given of points different from the first embodiment with respect to the second embodiment. In the first embodiment, a configuration has been described in which a threshold matrix for performing dither processing is generated using a plurality of dot sizes in a low density region. As a result, it is possible to steadily maintain the stability of the low density region and to improve the reproducibility and graininess of the low density region while suppressing the occurrence of an anomalous texture using a small threshold matrix. In the present embodiment, a threshold matrix for performing dither processing is generated using a plurality of dot sizes in a high density region as well. That is, by combining the present embodiment and the first embodiment, it is possible to steadily maintain stability and to improve reproducibility and granularity while suppressing the occurrence of an anomalous texture in extreme density regions including low density regions and high density regions.

Figure 11:
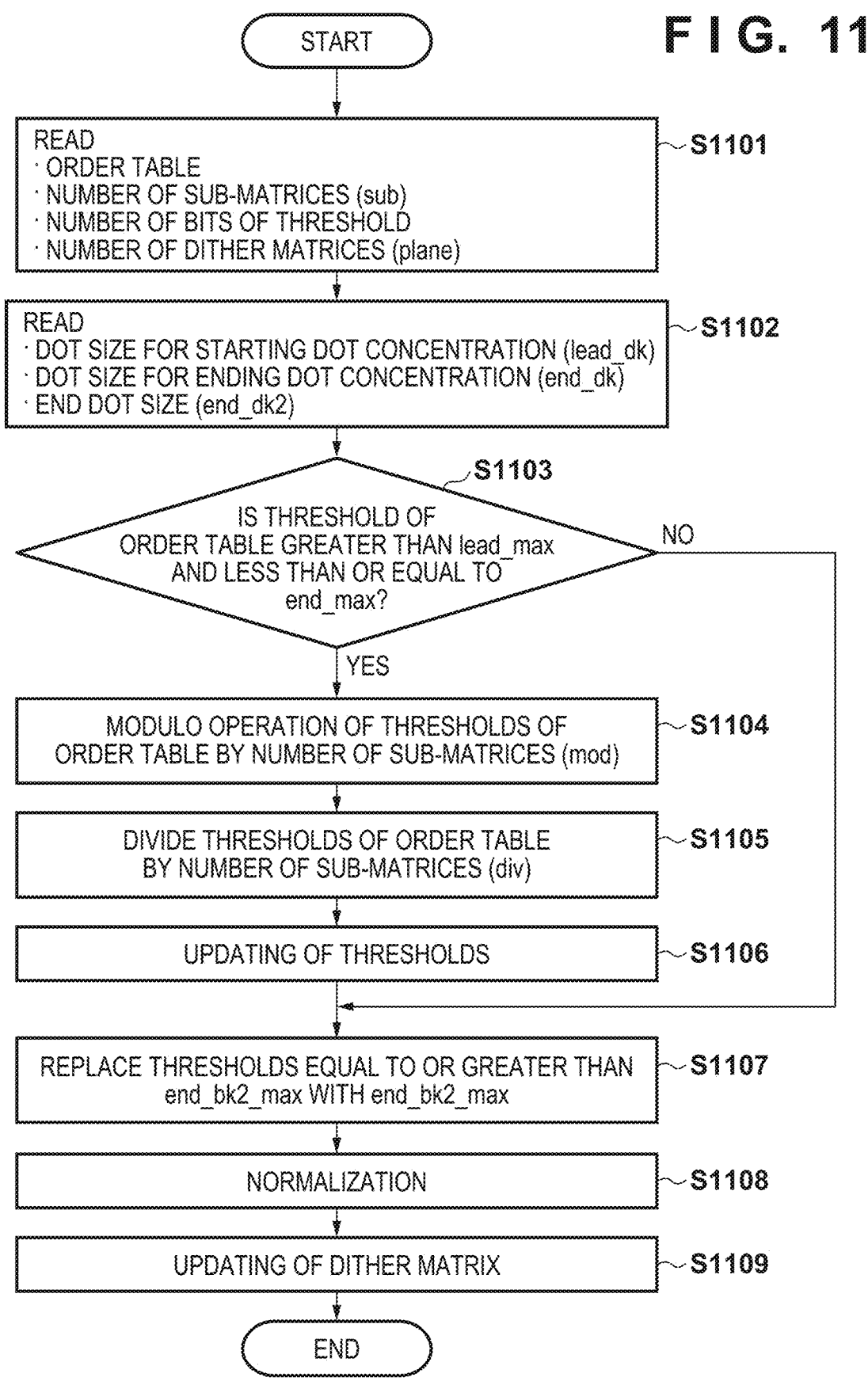
FIG. 11 is a flowchart showing a processing procedure for generating a threshold matrix.

FIG. 11 is a flowchart showing a processing procedure for generating a threshold matrix in the present embodiment. The processing of FIG. 11 is realized by, for example, the CPU 101 loading a program stored in the ROM 102 into the RAM 103 and executing the program.

Step S1101 is similar to step S501 of FIG. 5, and, therefore, a description thereof is omitted.

In step S1102, the CPU 101 loads from the ROM 102 a predefined dot size (hereafter referred to as "lead_dk") for starting dot concentration, a dot size (hereafter referred to as "end_dk") for ending dot concentration, and, finally a dot size (hereafter referred to as "end_dk2") for simultaneous appearance.

Each of the above-mentioned dot sizes is changed to an appropriate dot size in accordance with a usage environment (temperature and humidity), in accordance with change over time, and in accordance with a sheet (print medium) to be used. Therefore, similar to the first embodiment, combinations of dot sizes of a plurality of patterns are stored in the ROM 102, and patterns to be read are switched according to a condition.

Next, in step S1103, based on the order table read in step S1101 and the two dot sizes of "lead_dk" and "end_dk" read in step S1102, the CPU 101 determines whether or not a threshold obtained from a respective value of the order table is a threshold to be subjected to dot-concentrated-type growth.

Figure 12A:
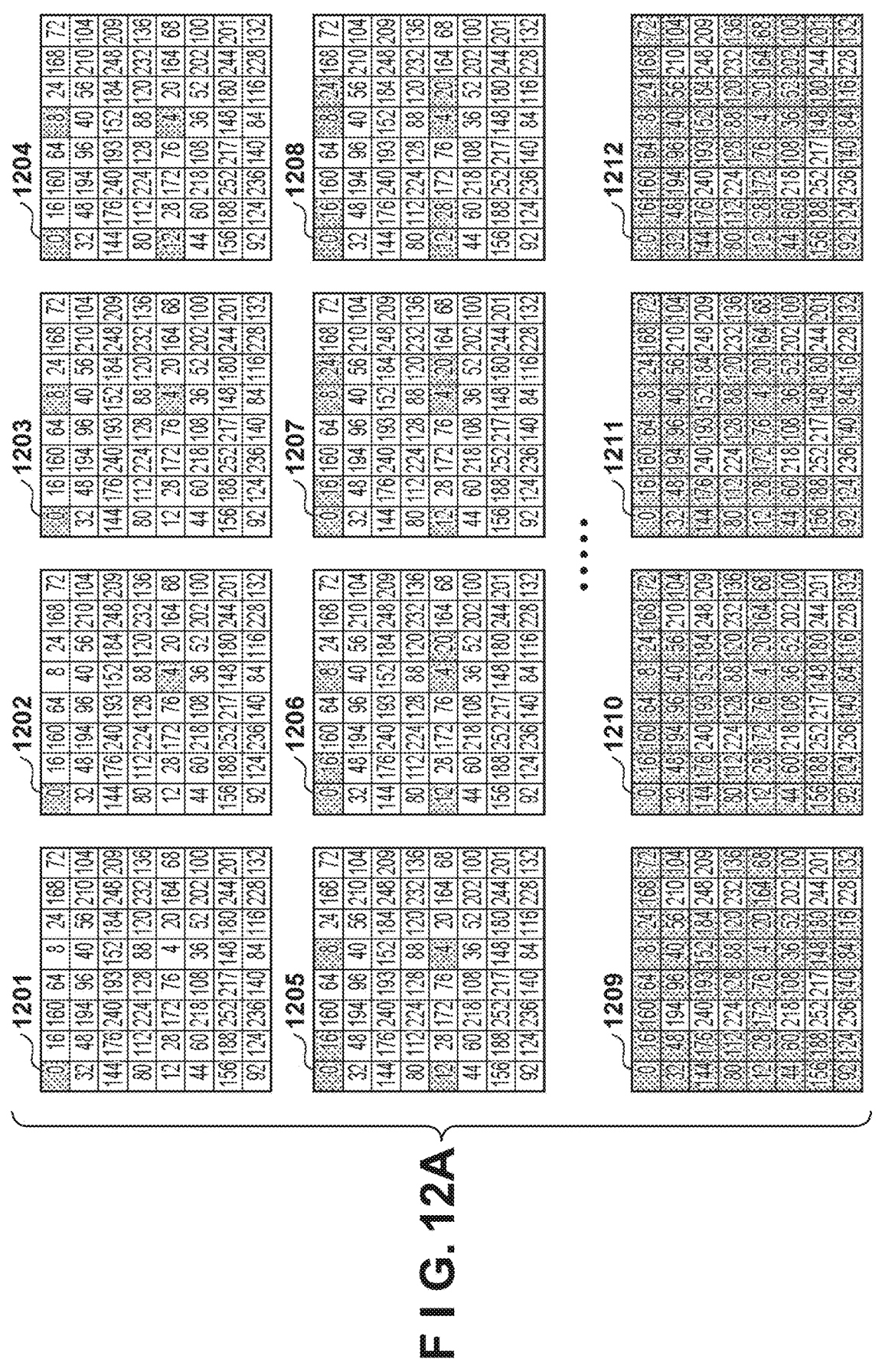
Figure 12B:
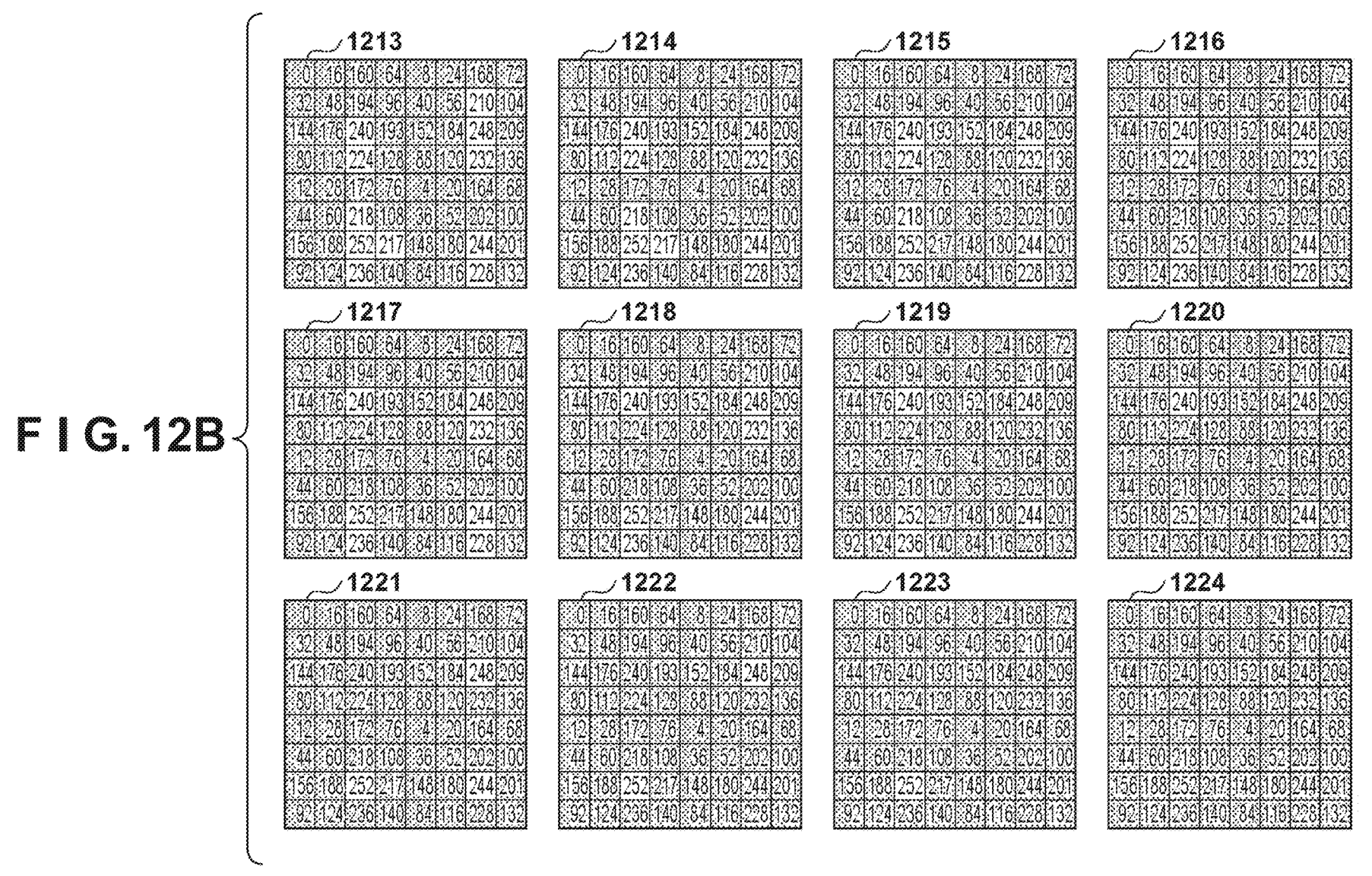

FIGS. 12A and 12B are diagrams illustrating an example of a threshold matrix having an engine resolution of 600 dpi, a screen of one hundred fifty lines and zero degrees, and where lead_dk=4 and end_dk=2.

In the threshold matrices 1201 to 1208, since all the dot sizes of remaining pixels are lead_dk or more, dots appear (are added) one pixel at a time for each halftone dot, and each halftone dot is grown with the same dot size. In the present embodiment, the term "remaining pixels" means a group of pixels in which dots have not yet appeared. On the other hand, since at least one of the dot sizes of the remaining pixels is less than lead_dk, the threshold matrices 1209 to 1216 have thresholds that are targets for dot-concentrated-type growth.

Dot-concentrated-type growth is a method in which the size of one halftone dot is grown until the dot size of remaining pixels becomes a dot size (hereafter referred to as end_dk) at which a predetermined dot concentration is complete, and then the growth proceeds to the next halftone dot, and the size of the dot is similarly grown. Since FIGS. 12A and 12B are examples of the case when end_dk=two, in the thresholds 1209 and 1210 growth is performed until the dot size of remaining pixels becomes end_dk=two, and in the threshold matrices 1211 and 1212 growth is similarly performed for the next halftone dot until the dot size of remaining pixels become end_dk=two.

Further, in threshold matrices 1217 to 1220, since all the dot sizes of the remaining pixels are end_dk or less, dots are caused to sequentially appear (be added) pixel by pixel at each halftone dot, and dots of all the pixels appear in a threshold matrix 1224.

As a determination method in step S1103, a calculation is performed for "lead_max" which is calculated by the following Equation (5) and "end_max" which is calculated by the following Equation (6).

$$\text{lead\_max} = \text{max} - \text{sub} \times \text{lead\_}dk \times \text{plane} \quad (5)$$

$$\text{end\_max} = \text{max} - \text{sub} \times \text{end\_}dk \times \text{plane} \quad (6)$$

Then, the CPU 101 determines that a threshold that is greater than to "lead_max" and less than or equal to "end_max" is a threshold that is the target of dot-concentrated-type growth. Here, "lead_max" indicates a threshold for starting dot-concentrated-type growth, and "end_max" indicates a threshold for ending dot-concentrated-type growth. In addition, "max" represents the maximum threshold of the threshold matrix. Also, "sub" indicates the number of sub-matrices, and sub=sixteen in the examples of FIGS. 12A and 12B. The term "plane" indicates the number of threshold matrices, and plane=one in the examples of FIGS. 12A and 12B. At this time, since max=255 in the case of an eight-bit threshold matrix, lead_max=191 and end_max=223. If it is determined in step S1103 that the threshold is a target of dot-concentrated-type growth, the process proceeds to S1104, and if it is determined that the threshold is not a target of dot-concentrated-type growth, the process proceeds to S1107.

Next, since step S1104 and step S1105 are similar to step S504 and step S505 of FIG. 5, their descriptions are omitted.

Next, in step S1106, the CPU 101 calculates an updated threshold (mtx) in accordance with the following Equation (7) with respect to the threshold obtained from the order table.

$$mtx = (\text{plane} \times \text{lead\_}dk) \times \text{mod} + \text{div} + \text{lead\_max} - (\text{plane} \times \text{end\_}dk \times \text{mod}) \quad (7)$$

Here, "mtx" indicates the updated threshold, "mod" indicates a value resulting from performing a modulo operation, by the number of sub-matrices, on a result of subtracting "lead_max" from the threshold obtained from the order table. Here, "lead_dk" indicates the dot size at which dot concentration starts, and "end_dk" indicates the dot size at which dot concentration ends. In addition, "div" represents a value obtained by subtracting "lead_max" from the threshold of the order table and then dividing by the number of sub-matrices, "sub" represents the number of sub-matrices (sub=16 in FIGS. 12A and 12B), and "plane" represents the number of threshold matrices (plane=1 in FIGS. 12A and 12B). For example, since sub=sixteen, when an inputted threshold is 208, mod=one, div=one, and mtx=one hundred ninety-four.

Figures 13A, 13B:
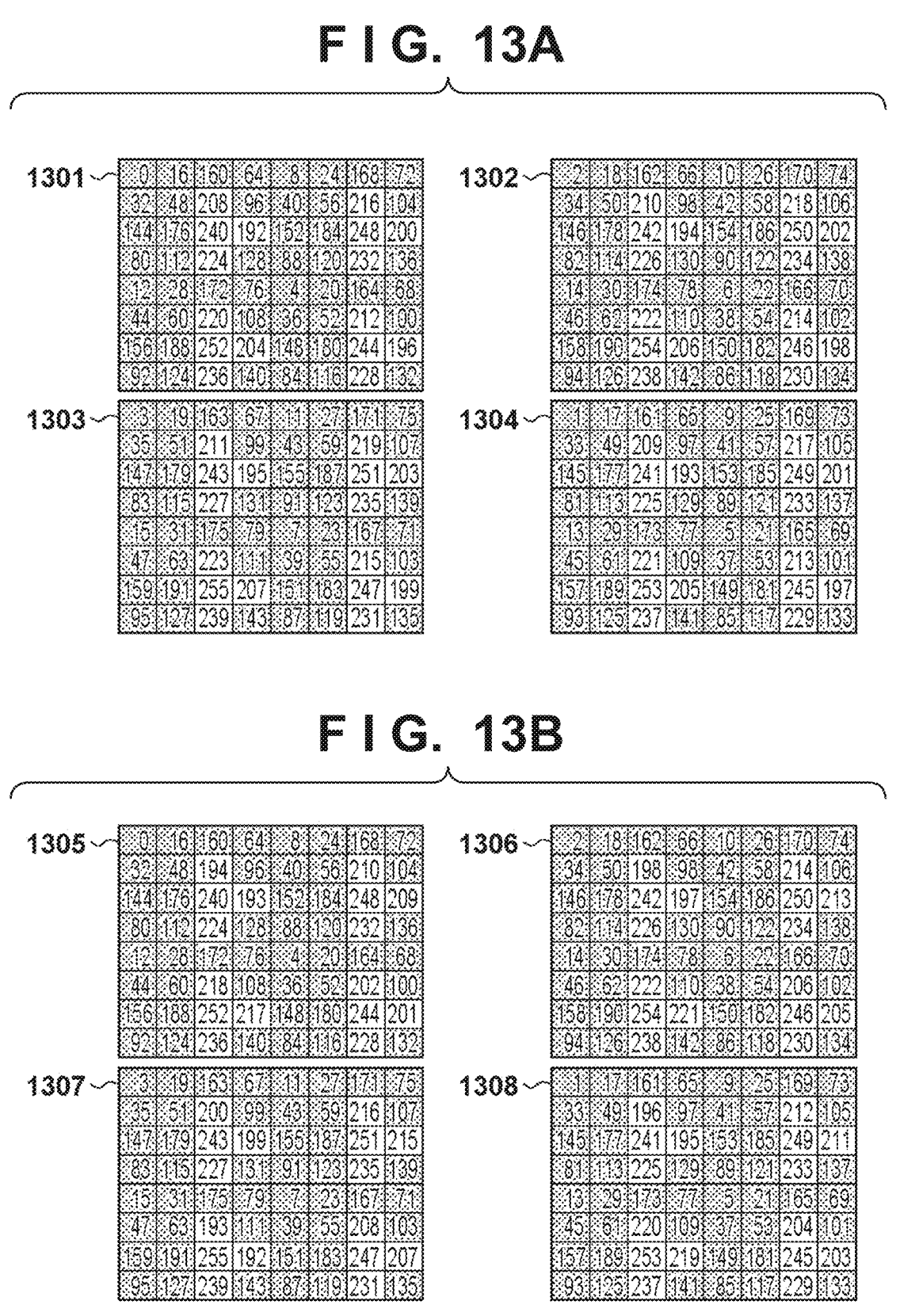

FIGS. 13A to 13C are diagrams for describing updating thresholds of a threshold matrix. The threshold matrix of FIG. 13B shows an example of updated thresholds, and compared to the threshold matrix of FIG. 13A before the updating, the updated thresholds are shown among the thresholds whose background is white. However, non-white thresholds are thresholds which are a target of the AM method, and therefore are not changed between FIG. 13A and FIG. 13B except that the normalization is performed in step S1108 at a subsequent stage.

Next, in step S1107, based on the dot size (end_dk2) to finally cause to appear at the same time, the CPU 101 determines whether or not the respective thresholds of mtx are thresholds that are targets for finally causing appearance at the same time. As a determination method, the number of dots (end_dk2_max) to finally cause to appear at the same time is calculated by the following Equation (8).

$$\text{end\_}dk2\text{\_max}=\text{max}-\text{sub}\times\text{end\_}dk2\times\text{plane} \qquad (8)$$

Then, from the threshold mtx, the CPU 101 replaces thresholds that are end_dk2_max or more with end_dk2_max. Here, "end_dk2_max" indicates the threshold at which the last simultaneous appearance occurs, "max" indicates the maximum threshold of the threshold matrix, and "sub" indicates the number of sub-matrices (sub=16 in the examples of FIGS. 12A and 12B). In addition, "end_dk2" indicates the size of dots that are to appear at the end at the same time, and "plane" indicates the number of threshold matrices (plane=1 in FIGS. 12A and 12B).

The reason why simultaneous appearance is caused at the end is that it is possible that blank dots of one dot will collapse in a high resolution engine such as where the engine resolution is 2400 dpi because of electrophotographic characteristics. Therefore, the size of dots (end_dk2) to ultimately cause to appear simultaneously is determined in advance, and when end_dk2=one, single dots are collectively caused to appear for each halftone dot at the end. That is, in FIGS. 12A and 12B, after the threshold matrix 1220, threshold matrices 1221 to 1223 are skipped, and the processing ends with the threshold matrix 1224. Thus, by narrowing the tone region in which blank dots are not reproduced in a high density region, the tonality of the high density region can be enhanced.

Next, in step S1108, the CPU 101 performs normalization on the thresholds updated in step S1107 based on the largest value of the threshold and the number of bits (bit) of the threshold. In step S1109, the CPU 101 stores the threshold normalized in step S1108 as the corrected threshold matrix in the threshold matrix storage unit 205. Through the above-described process, the threshold matrix is generated based on the three dot sizes ("lead_dk", "end_dk" and "end_dk2") that are determined for the respective colors.

The threshold matrix of FIG. 13C shows an example of updated thresholds that are ultimately created. Compared with the threshold matrix of FIG. 13A, the thresholds whose background is white were update targets, and further, since end_dk2=1, updates were made to have thresholds to simultaneously cause appearance at the end with one dot. Thresholds whose background is not white are thresholds which are a target of the AM method, and, therefore, are not changed between FIG. 13A and FIG. 13C except that the normalization is performed in step S1108.

FIG. 14 is a flowchart for describing an operation of dot growth by using the threshold matrix generated by FIG. 11.

In step S1401, the image forming unit 206 sequentially causes one pixel to appear (is added) at each halftone dot. When the dot sizes of the remaining pixels become lead_dk=4, the process proceeds to step S1402.

In step S1402, the image forming unit 206 starts the dot-concentrated-type growth. Dot-concentrated-type growth is a method in which the size of one halftone dot is grown until the dot size of remaining pixels becomes a dot size (end_dk2) at which a predetermined dot concentration is complete. Step S1402 corresponds to the threshold matrices 1209 to 1216 of FIGS. 12A and 12B.

In step S1403, the image forming unit 206 causes dots to appear (add) one pixel at each halftone dot, and grows each halftone dot with equal dot sizes. Step S1403 corresponds to the threshold matrices 1217 to 1223 of FIG. 12B. As shown in the threshold matrix 1224, when all the pixels appear, the processing of FIG. 14 ends.

Note that, in the present embodiment, step S1401 to step S1403 are used to describe the process of dot growth, but there is no limitation to this. Halftone image data can also be generated by comparing an input image with a threshold matrix in accordance with a hardware circuit included in the image forming unit 206.

As described above, the image forming apparatus according to the present embodiment uses a plurality of dot sizes in a high density region to generate a threshold matrix for performing the dither process. As a result, it is possible to steadily maintain the stability of the high density region and improve the reproducibility and graininess of the high density region while suppressing the occurrence of an anomalous texture using a small threshold matrix. Further, the third embodiment may be combined with the first embodiment. With such a configuration, it is possible to improve the reproducibility and granularity of density while suppressing the occurrence of an anomalous texture in both a low density region and a high density region.

The present invention is not limited to the embodiments described above, and various modifications and variations are possible without departing from the spirit and scope of the invention. Accordingly, the claims are appended hereto in order to make the scope of the invention public.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
   a conversion unit configured to convert multi-valued image data to image data for an output apparatus, using a dither matrix in which a threshold is set for each pixel, wherein, the thresholds are defined in the dither matrix such that:
   a first dot and a second dot alternately become larger until both of the first dot and the second dot reach a first dot size,
   after both of the first dot and the second dot reach the first dot size, the first dot becomes larger until the first dot reaches a second dot size while the second dot does not become larger, and thereafter, the second dot becomes larger until the second dot reaches the second dot size while the first dot does not become larger, and
   after both of the first dot and the second dot reach the second dot size, the first dot and the second dot alternately become larger.

2. The image forming apparatus according to claim 1, wherein the first dot size and the second dot size differ in size by a plurality of pixels.

3. The image forming apparatus according to claim 2, wherein the first dot size is a size of a dot that comprises a plurality of pixels.

4. A dither matrix generation method comprising:
   generating a dither matrix, in which thresholds for causing growth to dot sizes for a first dot and a second dot are set, the dither matrix used when converting multi-valued data to image data for an output apparatus, wherein, the thresholds are defined in the generated dither matrix such that:
   the first dot and the second dot alternately become larger until both of the first dot and the second dot reach a first dot size,
   after both of the first dot and the second dot reach the first dot size, the first dot becomes larger until the first dot reaches a second dot size while the second dot does not become larger, and thereafter, the second dot becomes larger until the second dot reaches the second dot size while the first dot does not become larger, and
   after both of the first dot and the second dot reach the second dot size, the first dot and the second dot alternately become larger.

5. The dither matrix generation method according to claim 4, wherein the first dot size and the second dot size differ in size by a plurality of pixels.

6. The dither matrix generation method according to claim 5, wherein the first dot size is a size of a dot that comprises a plurality of pixels.

7. A dither matrix generation apparatus, comprising:
   a generation unit configured to generate a dither matrix, in which thresholds for causing growth to dot sizes for a first dot and a second dot are set, the dither matrix used when converting multivalued data to image data for an output apparatus, wherein, the thresholds are defined in the dither matrix generated by the generation unit such that:
   a first dot and a second dot alternately become larger until both of the first dot and the second dot reach a first dot size,
   after both of the first dot and the second dot reach the first dot size, the first dot becomes larger until the first dot reaches a second dot size while the second dot does not become larger, and thereafter, the second dot becomes larger until the second dot reaches the second dot size while the first dot does not become larger, and
   after both of the first dot and the second dot reach the second dot size, the first dot and the second dot alternately become larger.

8. The dither matrix generation apparatus according to claim 7, wherein the first dot size and the second dot size differ in size by a plurality of pixels.

9. The dither matrix generation apparatus according to claim 8, wherein the first dot size is a size of a dot that comprises a plurality of pixels.

* * * * *